United States Patent [19]

Dahms

[11] 4,210,421
[45] Jul. 1, 1980

[54] METHOD FOR REDUCING KCL TAILINGS LOSS FROM EVAPORATION

[75] Inventor: James B. Dahms, London, England
[73] Assignee: PPG Industries, Inc., Pittsburgh, Pa.
[21] Appl. No.: 960,197
[22] Filed: Nov. 13, 1978
[51] Int. Cl.² .............................................. B01D 1/26
[52] U.S. Cl. ..................................... 23/303; 423/205; 159/20 R; 159/45
[58] Field of Search .................. 159/20 R, 20 CS, 45, 159/47 R, DIG. 8; 23/302 T, 303, 304; 423/205, 203

[56] References Cited
U.S. PATENT DOCUMENTS

| | | | |
|---|---|---|---|
| 3,155,458 | 11/1964 | Fiedelman et al. | 23/303 |
| 3,365,278 | 1/1968 | Kelly et al. | 159/45 |

*Primary Examiner*—Norman Yudkoff
*Attorney, Agent, or Firm*—Walter M. Benjamin

[57] ABSTRACT

Disclosed is an improved method of concentrating with respect to a first salt an aqueous solution containing the first salt and a second salt, the solubility of the first salt increasing more with increasing temperatures than the solubility of the second salt, by multiple stage evaporation at progressively higher temperatures and backward feed, wherein first salt and second salt is precipitated in an evaporator stage which communicates with an elutriation leg, wherein an aqueous slurry containing first salt and second salt is withdrawn from the elutriation leg and wherein the concentrated solution is forwarded to a step where the first salt is recovered. In the improved method, slurry withdrawn from the evaporator stages is leached with raw feed and/or mother liquor from this step in which the first salt is recovered to dissolve first salt from the slurry and return the dissolved first salt to the evaporator effect.

6 Claims, 1 Drawing Figure

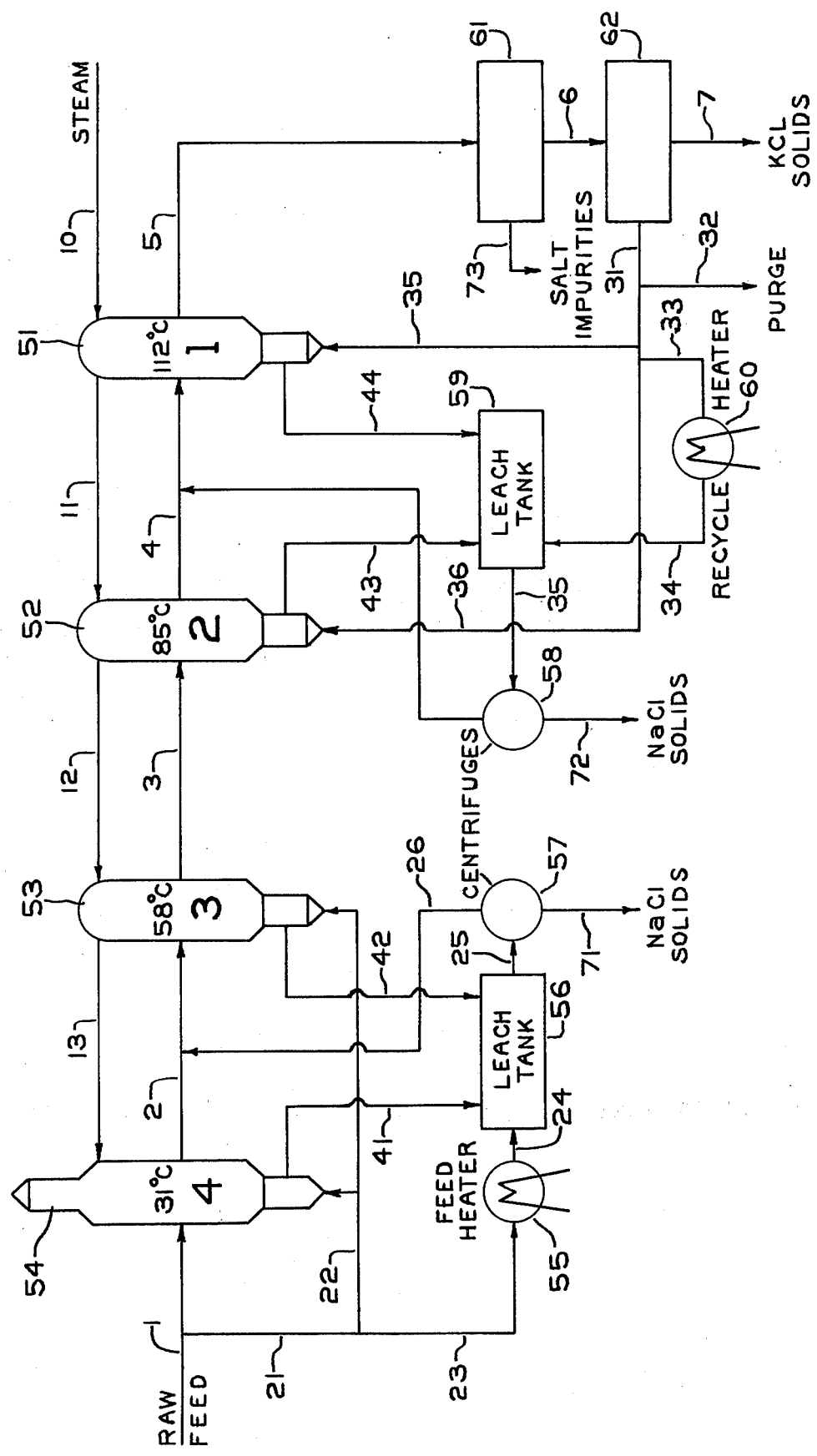

METHOD FOR REDUCING KCL TAILINGS LOSS FROM EVAPORATION

BACKGROUND OF THE INVENTION

This invention relates to an improved method of concentrating by multiple stage evaporation solutions containing mixtures of salt and particularly this invention relates to concentrating by multiple effect evaporation solutions containing a first and a second salt where the solubility of the first salt increases more with increasing temperature than the solubility of the second salt. More particularly, this invention relates to an improved method whereby the solution concentrated contains principally potassium chloride, sodium chloride and a minor amount of salt impurities such as chlorides and sulfates of magnesium and calcium.

Salts having a solubility that increases with increasing temperatures within a given temperature range, hereinafter called first salts, and salts having a solubility that remains relatively unchanged or decreases with increasing temperature within the same temperature range, hereinafter called second salts, are frequently encountered as mixtures in naturally occurring ores. In recovering such salts, the ore is dissolved in a suitable aqueous solvent forming a solution from which the salts can be easily separated. Admixtures of these salts in solution can also arise as a result of industrial chemical processes, e.g., as a result of the electrolysis of electrolytes.

These salts can be separated from the solution by concentrating the solution by evaporation to produce a solution in which the first and second salt are concentrated to their "invariant composition." By "invariant composition" is meant a composition in which a solution at a given temperature is saturated with respect to two or more salts. This solution is forwarded to a recovery zone where the first salt is recovered, e.g., by cooling the solution so that the first salt will selectively crystallize out of solution and precipitate. The temperature range at which the water removal step and cooling step take place is a range in which the first salt and second salt maintain their solubility characteristics. If the second salt is initially in high enough concentration, it will be precipitated and can be recovered during the initial evaporation step. Otherwise, subsequent evaporation after recovering the first salt can yield production of the second salt. Thus, alternate evaporation and cooling can substantially deplete the solution of the first and second salt.

Potassium chloride (first salt) and sodium chloride (second salt) are recovered commercially from naturally occurring ores which comprise principally potassium chloride and sodium chloride and which comprise to a lesser extent a minor amount of salt impurities such as chlorides and sulfates of magnesium and calcium, e.g., less than 6 percent of salt impurities. In this commercially practiced method water is removed from the solution by evaporation until the solution approaches or reaches its invariant composition. Large amounts of sodium chloride and some salt impurities are precipitated and sodium chloride removed during the evaporation step. The solution is then purged of impurities, which are precipitated during evaporation after which the solution is cooled to crystallize potassium chloride while other salts and impurities remain in solution.

The invariant composition of potassium chloride-sodium chloride solutions is affected by other salts in the solution. For example, solutions of many naturally occurring potassium chloride-sodium chloride containing ores also comprise chlorides, carbonates, sulfates and like cations of anions other than sodium and potassium. The presence of some of these other salts will lower the salt concentration of the invariant composition from the concentration of a pure sodium chloride-potassium chloride solution. For example, the presence of a few parts magnesium chloride per hundred parts water will lower the invariant composition by a few parts each of sodium chloride and potassium chloride.

Evaporation of potassium chloride-sodium chloride solutions are carried out with great expediency by multiple effect evaporation to achieve high product recovery and great steam economy. The multiple effect evaporators are operated at progressively higher temperatures in the direction of the flow of the solution. That is, mother liquor effluent overflow from cooler evaporator effects is forwarded to hotter evaporator effects. To obtain a satisfactory working temperature difference between the first evaporator effect and the last evaporator effect, the first evaporator effect is operated under super atmospheric pressure and the last evaporator effect is operated under vacuum. As the solution passes through each evaporation effect, water is removed in the form of vapor and the solution becomes concentrated with respect to potassium chloride while precipitating sodium chloride which settles into and is removed from an elutriation leg in communication with the bottom of each evaporator. Sodium chloride will precipitate until the solution reaches its invariant composition for the temperature at which each evaporator effect is operated. Impurities which have solubility characteristics of second salts may be precipitated as well during the process but are fluidized by an elutriating liquid so that sodium chloride can be recovered relatively pure. These precipitated salt impurities are usually very fine so that an elutriating liquid such as raw feed or mother liquor effluent from the step in which potassium chloride is recovered can selectively fluidize the impurities while sodium chloride settles relatively pure.

Since the feed solution is relatively cool, the evaporator effects are heated by steam in a direction opposite to that of the solution, i.e., backward feed. The first evaporator effect is heated by introducing steam from an external source, such as a boiler, and the second evaporator effect is heated with vapor from the first evaporators effect and so on progressively to the last evaporator effect whose vapor is utilized for whatever requirement for low value steam or is condensed in a condenser.

Mother liquor effluent overflow from the first evaporator effect is transferred to a potassium chloride recovery step whereby potassium chloride is precipitated by cooling. An expedient method of cooling utilizes evaporative crystallizers which partially depletes the mother liquor of potassium chloride after which the lean mother liquor is recycled back to the evaporators for further concentration with respect to potassium chloride since this mother liquor may be richer in potassium chloride than the raw feed.

Oftentimes where the evaporation system is designed to concentrate a raw feed having a particularly low level of potassium chloride content, potassium chloride is precipitated along with sodium chloride when the raw feed contain higher levels of potassium chloride. This problem arises from the invariant nature of a multiple effect evaporation system, which is owing to the temperature and extent of concentration in each evaporator body being defined by the feed solution flow rate, the steam load and the phase relationship of an aqueous solution containing principally potassium chloride and sodium chloride. The precipitation of potassium chloride can be avoided by modifying the system, but would still leave a relatively inflexible operation.

U.S. Pat. No. 3,704,101 to Kelly discloses a method of solving the problem by forwarding sodium chloride slurry from cooler evaporator effects to hotter evaporator effects, wherein precipitated potassium chloride is dissolved. Also disclosed in the method is the elutriation of slurry in the legs of cooler evaporators with raw feed and the elutriation of slurry in the legs of hotter evaporators with mother liquor from the potassium chloride recovery step whereby both elutriants fluidize impurities but also dissolve some precipitated potassium chloride. This method is undesirable because solids in at least one evaporator must be free of potassium chloride to avoid loss thereof when the withdrawn slurry is purged from the evaporation system. Hence, this evaporator cannot operate at saturation with respect to potassium chloride. The elutriating liquids do not dissolve all precipitated potassium chloride because the elutriating conditions are not for leaching but are set primarily for fluidizing salt impurities, the consequence of which may not cause virtually all precipitated potassium chloride to be dissolved (i.e., because of upward flow rates and temperature.)

In a co-pending co-assigned application, Ser. No. 892,454, disclosed is a method of solving the problem, resulting from allowing the first evaporator effect to operate at saturation with respect to potassium chloride, by recycling slurry from the first evaporator effect to a cooler evaporator effect. This method may also be undesirable owing to a loss in steam economy due to the sensible heat of the salt. Also, as in the above method, at least one evaporator effect should be free of precipitated potassium chloride to avoid loss of potassium chloride therefrom.

SUMMARY OF THE INVENTION

It has been found that in the above described method of separating mixtures of a first salt and a second salt, there is an improvement whereby first salt which is co-precipitated with second salt during evaporation is recovered while all evaporators can operate at saturation with respect to first salt. In this improved method slurry which is withdrawn from the evaporators is leached in a separate vessel with a heated raw feed and/or mother liquor from the first salt recovery step which may or may not be heated. Thus precipitated first salt is selectively dissolved and recycled back to the evaporators, thereby enhancing efficiency, avoiding loss of first salt and producing relatively pure second salt.

BRIEF DESCRIPTION OF THE DRAWINGS

Further benefits and advantages will become apparent in light of the detailed description made below with reference to the drawing in which a four effect evaporation system in accordance with the present invention is diagrammatically illustrated.

DETAILED DESCRIPTION OF THE INVENTION

According to the present invention, an improvement of the above described method is disclosed whereby first salt which is co-precipitated with second salt, during the evaporation of a solution containing a mixture of the salts, is recovered by leaching in a separate vessel with heated raw feed and/or mother liquor from the step where first salt is produced. All of the evaporators can be operated at saturation with respect to first salt and precipitated potassium chloride which is dissolved by the leaching liquid is recycled back to the evaporators.

First salts treated by the method of the present invention are salts having a solubility increasing with increasing temperatures of its aqueous solutions within a given temperature range. Accordingly, first salts include salts such as potassium chloride, magnesium chloride, sodium carbonate, and sodium chlorate. The second salts are salts which do not form a compound with the first salt and which have a solubility increasing less with increasing temperatures (1) within the temperature range at which the evaporation is to be carried out, and, (2) within the temperature range at which the solubility of the first salt increases with increasing temperatures. Hence, an increase in solution temperature will increase the solubility of the second salt much less than the increase in temperature will increase the solubility of the first salt. Accordingly, second salts include those that have a solubility which remains relatively unchanged or which decreases with increasing solution temperatures and include sodium chloride, calcium sulfate and magnesium sulfate. However, the method of the present invention will be described with respect to potassium chloride and sodium chloride as the first and second salts.

A portion of the feed or a portion of mother liquor from the step where potassium chloride is recovered is utilized to leach solids precipitated in the evaporators. It is preferred that before contacting the solids the leaching liquids are heated to create a greater capacity therein to selectively dissolve potassium chloride. The capacity should be great enough to dissolve essentially all of the precipitated potassium chloride by the method and rate the leaching liquid contacts the solids and preferably the capacity should be greater than that which is necessary to dissolve all of the precipitated potassium chloride, but not so much greater that the recycled leaching liquid containing the dissolved potassium chloride would overly heat the stream into which it is mixed.

Solids which are precipitated in and withdrawn from evaporators and the leaching liquid having the capacity to dissolve potassium chloride are both fed into a vessel separate from the evaporator in such a manner that the leaching liquid intimately contacts the solids in the vessel for a time sufficient to selectively dissolve precipitated potassium chloride. Intimate contact may be facilitated by agitation such as stirring or fluidization of the solids by the leaching liquid or fluidization by some other inert non-diluting fluid. The time of contact may be controlled by utilizing an oversized vessel such that a slurry may be withdrawn from the vessel at a slower rate than the streams are fed to the vessel or vice versa, thereby increasing or decreasing the time of contact, respectively.

Withdrawn slurry is forwarded to a dewatering step wherefrom mother liquor is recycled back to the evaporators and wherefrom relatively pure sodium chloride is recovered. The mother liquor is recycled to an evaporator which operates at conditions most conducive to further concentrating a solution having its temperature and composition. Hence, it is important that the extent to which the leaching liquid is heated and the amount of potassium chloride dissolved therein during leaching is compatible with the evaporation stream with which it is to be mixed. Only to the extent that the amount of potassium chloride precipitated and dissolved is uncontrollable is it allowable that the recycled mother liquor be incompatible with the evaporation stream with which it is mixed.

Reference is now made to the drawing which further illustrates the invention. A solution of potassium chloride and sodium chloride containing 12.7 percent by weight potassium chloride and 20.1 percent by weight sodium chloride is fed via stream 1 to the fourth evaporator effect of multiple effect evaporators at a solution temperature of 47° C. Water is evaporated from the feed to the fourth evaporator effect 54 until the invariant composition is reached and a solution containing 14.1 percent potassium chloride and 17.6 percent sodium chloride is fed to the third evaporator effect 53, via stream 2. Because the invariant composition is reached, a solid crystallizate containing potassium chloride as well as sodium chloride is removed from the bottom (elutriation leg) of the fourth evaporator effect 54 and this is forwarded via stream 41 to a stirred leach tank 56. In the third evaporator effect 53 which has an operating temperature of 58° C., further quantities of water are removed from the potassium chloride-sodium chloride solution until the invariant composition is reached therein. The overflow solution 3 is fed into the second evaporator effect 52. The solid crystallizate from the third evaporator effect 53 is forwarded to leach tank 56 via stream 42. A portion 22 of raw feed 1 is fed into the bottom (elutriation leg) of the fourth and third evaporator effects 54 and 53 to fluidize salt impurities precipitated therein so that the impurities are carried over to subsequent evaporators via the overflow streams 2 and 3. The other portion 23 of raw feed 1 is heated by feed heater 55 and forwarded to leach tank 56 via stream 24. The leaching liquid (stream 24) leaches potassium chloride in leach tank 56 wherefrom slurry 25 is forwarded to centrifuge 57 and dewatered. Mother liquor 26 from centrifuge 57 is recycled to overflow 2 and relatively pure sodium chloride is produced via stream 71.

Overflow 4 from the second evaporator effect 52 is fed to the first evaporator effect 51 wherein as in the second evaporator effect 52, large quantities of water is evaporated until the invariant composition is reached for the respective evaporation temperatures. Consequently, large quantities of sodium chloride is precipitated in both evaporators and withdrawn via streams 43 and 44 and forwarded to leach tank 59. Mother liquor from the potassium chloride recovery step 62 is forwarded via stream 31 to recycle heater 60 and via stream 35 and 36 to the first and second evaporator effects 51 and 52 in which precipitated salt impurities are fluidized. These impurities are carried forward with overflows 4 and 5. Recycle stream 33 is heated and the heated stream 34 is fed to leach tank 59 which is stirred to enhance intimate contact between leaching liquid 34 and solids of stream 43 and 44. Only enough heat is provided by recycle heater 60 to dissolve precipitated potassium chloride. The heated recycle liquor should still be cool enough to recapture sensible heat from the hot solids of streams 43 and 44. Slurry from leach tank 59 is forwarded for dewatering in centrifuge 58 from which mother liquor 37 is recycled to overflow 4 and from which relatively pure sodium chloride solids are recovered via stream 72.

Overflow 5 which is forwarded to thickener 61, wherein impurities are separated and removed via stream 73, contains a considerably higher potassium chloride content than would be possible if the raw feed had been subjected to a simple stepwise evaporation, by which method there is loss of potassium chloride with sodium chloride. There is also a greater quantity of stream 5 than would be in the case where precipitated solids are forwarded to hotter evaporators or recycled to cooler evaporators, because in both methods there is one or more evaporator effects which should not be operated at saturation with respect to potassium chloride.

The extent to which raw feed 1 and recycle 3 is heated in accordance with the present invention may vary depending upon the amount of potassium chloride precipitated and the amount of sensible heat that can be recaptured by the leaching liquid from the solids precipitated in the hotter evaporators. The stream to which dewatering step mother liquor is recycled can be any stream depending upon the compatibility of the temperature and composition of the streams.

The evaporator temperatures are variable and will depend upon the type of multiple stage system employed and the most efficient conditions from the standpoint of steam economy, e.g., such as a multiple effect evaporation system. So long as each evaporator operates at a temperature sufficient to evaporate water from the solution feed, the particular temperature is of little moment. It is only important that the system operates such that the evaporator temperatures become progressively higher to selectively concentrate the solution with respect to the first salt during evaporation. The kind of equipment employed is similarly of little importance and recourse to any conventional evaporator equipment may be had.

Therefore, even though the invention has been described with reference to specific embodiments, it should not be regarded nor is it intended that it be limited thereby, except to the extent those limitations are recited in the claims.

What is claimed is:

1. In a method of concentrating with respect to potassium chloride, an aqueous solution containing potassium chloride, sodium chloride and a minor amount of salt impurities, by multiple stage evaporation at progressively higher temperatures and backward feed, wherein each evaporator stage communicates with an elutriation leg, wherein sodium chloride and potassium chloride solids co-precipitate in an evaporator stage and a slurry containing sodium chloride and potassium chloride solids are withdrawn from the elutriation leg of that stage and wherein the concentrated solution is forwarded to a step where potassium chloride is recovered by cooling, the improvement comprising:

A. leaching selectively in a separate vessel precipitated potassium chloride solids contained in the slurry withdrawn from the evaporator stage by initimately contacting and dissolving potassium chloride solids in the vessel with raw feed and/or mother liquor from the step where potassium chloride is recovered;

B. then separating the leach liquor from the sodium chloride solids and discharging the sodium chloride solids from the evaporation system; and C. recovering precipitated potassium chloride by recycling the enriched leaching liquid to an evaporator stage.

2. The method of claim 1, wherein solids contained in the slurry withdrawn from the hotter evaporator stages are leached with mother liquor from the step in which first salt is recovered, thereby selectively dissolving potassium chloride precipitated therein.

3. The method of claim 1, wherein solids contained in the slurry withdrawn from the cooler evaporator stage are leached with raw feed, thereby selectively dissolving potassium chloride precipitated therein.

4. The method of claim 1, 2 or 3, wherein the multiple stage evaporators are multiple effect evaporators comprising three or more evaporators.

5. The method of claim 1, wherein the raw feed is heated before leaching the solids.

6. The method of claim 1, wherein potassium chloride and sodium chloride solids are precipitated in all of the evaporators, and wherein the solids withdrawn from at least the hottest evaporator stage is leached by the leaching liquid.

* * * * *